G. H. SCHILLING & I. O. NEFF.
ENGINE VALVE GEAR.
APPLICATION FILED SEPT. 7, 1917.
1,266,325.
Patented May 14, 1918.
2 SHEETS—SHEET 2.
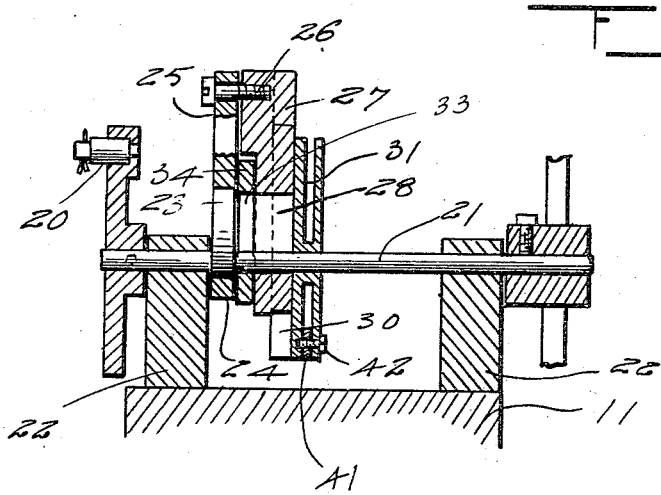
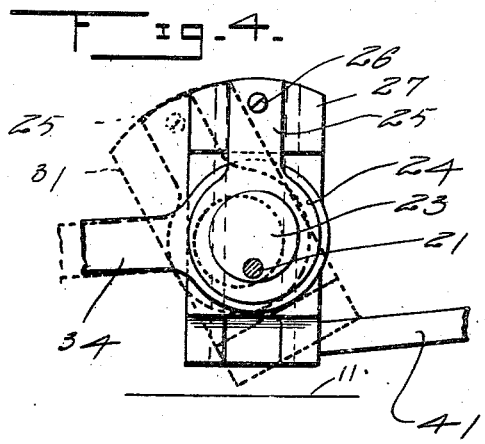
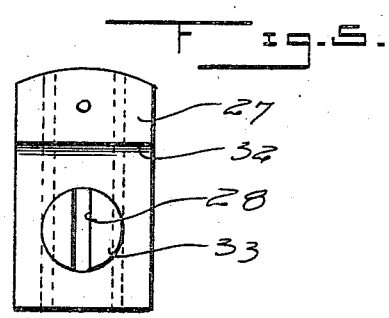
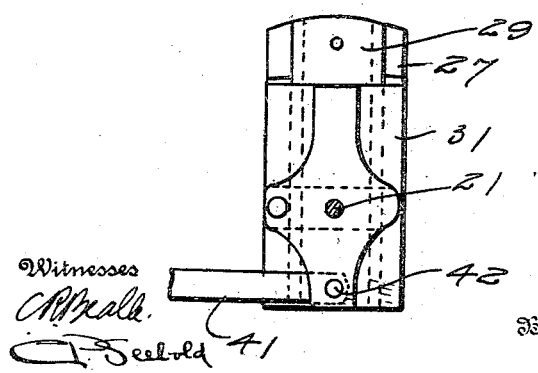
Witnesses
Inventor
G.H.Schilling
I.O.Neff
Attorney

UNITED STATES PATENT OFFICE.

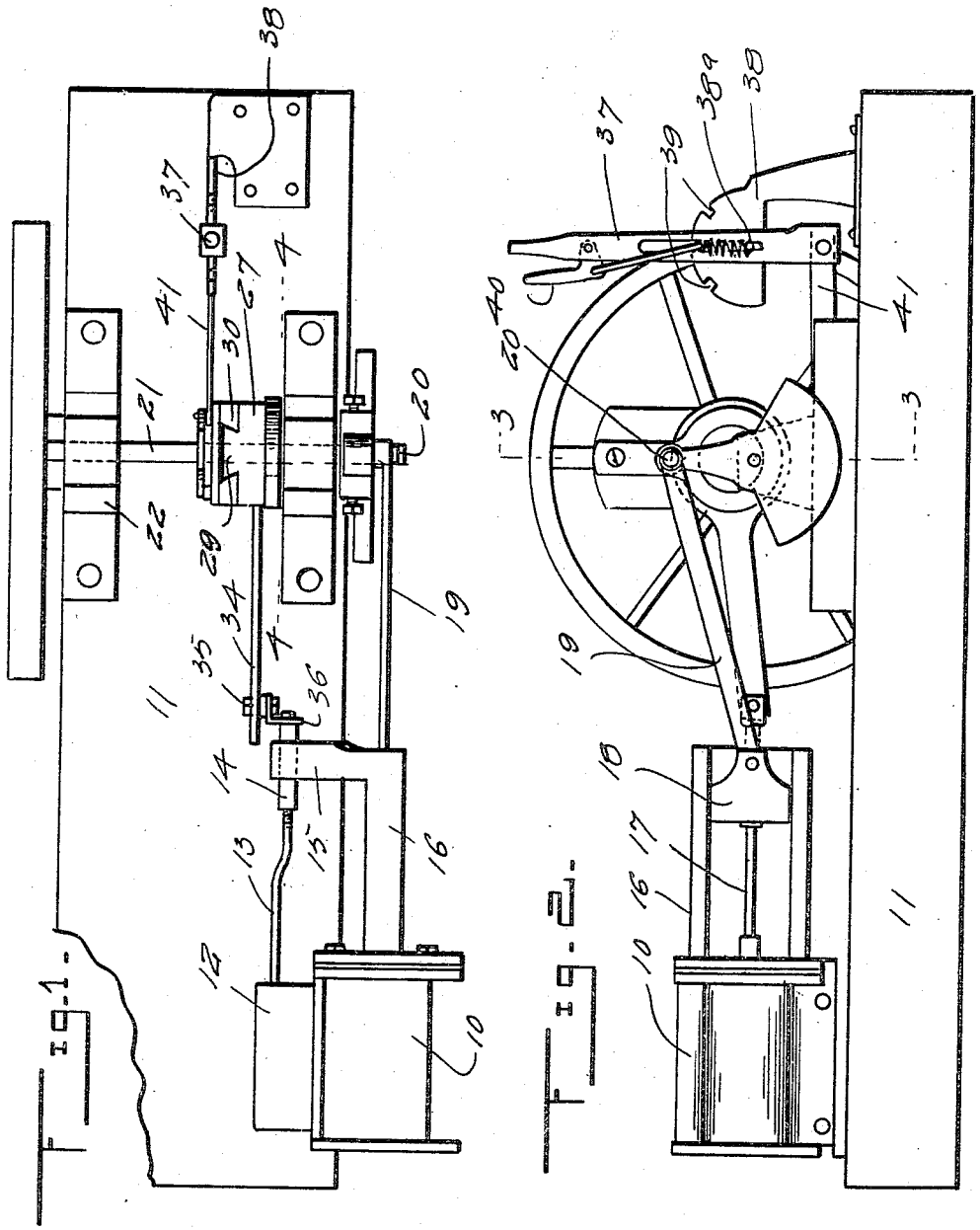

GEORGE H. SCHILLING AND IGNATZ O. NEFF, OF WATERLOO, ILLINOIS.

ENGINE VALVE-GEAR.

1,266,325.  Specification of Letters Patent.  Patented May 14, 1918.

Application filed September 7, 1917. Serial No. 190,177.

*To all whom it may concern:*

Be it known that we, GEORGE H. SCHILLING and IGNATZ O. NEFF, citizens of the United States, residing at Waterloo, in the county of Monroe and State of Illinois, have invented certain new and useful Improvements in Engine Valve-Gears; and that we do hereby declare the following to be a full, clear, and exact description of the invention, such as will enable others skilled in the art to which it appertains to make and use the same.

This invention relates to improvements in valve gears for steam engines, and has for its object to provide a valve gear operated by a single eccentric actuating a slidable block supported in an adjustable guide.

Another object is the provision of a valve gear in which the parts are compactly arranged and supported upon the crank shaft of the engine and are conveniently accessible for repair or replacement.

With these and other objects in view, the invention consists in the novel construction, combination and arrangement of parts as will be hereinafter specifically described, claimed and illustrated in the accompanying drawings, in which:

Figure 1 represents a fragmentary plan view of an engine, illustrating the improvements applied thereto, Fig. 2 represents a side elevation of the engine, Fig. 3 represents a vertical sectional view on the line 3—3 of Fig. 2, Fig. 4 represents a sectional view on the line 4—4 of Fig. 1, Fig. 5 represents a side elevation of the slidable block detached from the guide, and Fig. 6 represents a side elevation of the guide and block removed from the crank shaft.

Referring to the drawings in detail, wherein similar reference numerals designate corresponding parts throughout the several views, the numeral 10 indicates a steam engine cylinder, which is preferably supported upon a base structure 11, and is provided with a laterally projecting valve chest 12, receiving the slide valve (not shown), which is connected with the valve rod 13. The front terminal of the valve rod 13 is externally screw threaded and adjustably receives an internally screw threaded aperture formed longitudinally through a rectangular block 14, which latter is slidably supported in a lateral extension 15 of the crosshead guides 16.

The piston rod 17 is connected with the cross-head 18 slidably supported in the guides 16 and is connected by a connecting rod 19 with the crank pin 20 of the crank shaft 21. Bearings 22 are mounted upon the base 11 and rotatably support the crank shaft 21.

An eccentric 23 is non-rotatably secured to the crank shaft 21 and is received within the eccentric strap 24 carrying an arm 25. The upper terminal of the arm 25 is pivotally connected by a pin or screw 26 with the slide block 27, having a longitudinally elongated slot 28 slidably and rotatably receiving the crank shaft 21.

The side of the slidable block 27 opposite the eccentric 23 is formed with a longitudinal rib 29, having oppositely inclined side edges received within a dove-tail slot 30 formed in the guide 31, which latter is pivotally supported upon the crank shaft 21 and is designed to guide the reciprocating movement of the slide block 27 during rotation of the eccentric 23.

The side face of the block 27, which is presented to the eccentric arm 25, is recessed, as indicated at 32, and provided with a circular lug or boss 33, forming a pivot or fulcrum for the front terminal of the valve actuating rod 34 which is pivotally secured thereto and confined between the block 27 and the eccentric 23.

The opposite terminal of the valve actuating rod 34 is pivotally connected by a bolt or pin 35 with an angular coupling plate 36 carried by the front terminal of the block 14, whereby the reciprocating movement of the rod 34 is transmitted to the valve rod 13 and consequently to the slide valve in the chest 12. A hand lever 37 is pivotally secured at 38 to a segmental supporting plate 39, which latter is supported upon the base 11. The semicircular top edge of the plate 38 is provided with three equidistant notches 39, designed to coöperate with a locking device 40, whereby the hand lever 37 may be selectively locked in any one of three positions. The lower terminal of the hand lever 37 is pivotally connected with a rod 41, having connection at its rear terminal with the lower extremity of the slide block guide 31, as indicated at 42.

During rotation of the crank shaft, the slide block 27 is reciprocated in the adjustable guide 31 by the eccentric 23 and arm 25. When the hand lever 37 is moved to the vertical intermediate position, illustrated in Fig. 2, the guide 31 is moved to a corresponding vertical position directly at right angles to the movement of the valve rod 13, and consequently the reciprocation of the slide block 27 affects only a very slight movement of the rod 13 and valve insufficient to open the ports in the cylinder of the engine. However, when the hand lever 37 is swung forwardly, the upper terminal of the guide block 31 is tilted correspondingly and the block 27 is caused to reciprocate in a plane oblique to the axis of the movement of the valve rod 13, effecting a longitudinal reciprocation of the latter, together with the valve in the chest 12, causing the engine to drive forwardly. When the hand lever 37 is swung rearwardly the inclination of the guide 31 is reversed and the direction of reciprocation of the valve rod and valve correspondingly reversed, causing the engine to drive rearwardly.

What we claim is:

1. A valve gear for steam engines including a crank shaft, an eccentric secured thereto, a strap and arm associated with the eccentric, a guide pivotally supported upon the crank shaft, a valve operating block slidably mounted in the guide, confined between the latter and the eccentric and connected with the arm, and means for securing the guide in adjusted position.

2. A valve gear for steam engines, including a crank shaft, an eccentric secured thereto a strap and arm operable by the eccentric, a guide pivotally supported upon the crank shaft, and a valve operating block pivotally connected with said arm, said block slidably supported by the guide and located between the guide and the eccentric, said block provided with a slot slidably receiving the crank shaft.

3. A valve gear for steam engines including a crank shaft, an eccentric secured thereto, a strap and arm associated with the eccentric, a guide pivotally supported upon the crank shaft having a groove therein, a reciprocable block having a slot slidably receiving the crank shaft, a rib formed longitudinally of the block and parallel with the slot and slidably mounted in the groove in the guide, and means pivotally connecting the block with the arm.

4. A valve gear for steam engines including a crank shaft, an eccentric secured thereto, a strap and arm connected with the eccentric, a block pivotally connected with the arm, a circular lug formed on said block, said block having a longitudinal slot intersecting the center of the circular lug and slidably receiving the crank shaft, a valve operating rod pivotally connected with the lug, and a guide for said block pivotally supported upon the crank shaft.

5. A valve gear for steam engines including a crank shaft, an eccentric secured thereto, a strap and arm connected with the eccentric, a block pivotally connected with the arm, a circular lug formed on the block, a valve operating rod pivotally connected with the lug, a guide pivotally supported upon the crank shaft having a groove in one face, and a rib formed on the block slidably received in the groove in the guide.

In testimony whereof we affix our signatures in presence of two witnesses.

GEORGE H. SCHILLING.
IGNATZ O. NEFF.

Witnesses:
 GEO. GAMBACH,
 MATT L. CROWE.